United States Patent [19]

Li

[11] Patent Number: 4,618,271
[45] Date of Patent: Oct. 21, 1986

[54] SERIAL BEARING ASSEMBLY

[75] Inventor: Paul Z. Li, Tallahassee, Fla.

[73] Assignee: Florida State University, Tallahassee, Fla.

[21] Appl. No.: 807,659

[22] Filed: Dec. 11, 1985

[51] Int. Cl.⁴ ............................................. F16C 19/08
[52] U.S. Cl. ................................... 384/461; 384/494; 384/550; 384/613
[58] Field of Search ............... 384/461, 550, 494, 554, 384/490, 613

[56] References Cited

U.S. PATENT DOCUMENTS

| | | | |
|---|---|---|---|
| 448,624 | 3/1891 | Andrews | 384/550 |
| 473,974 | 5/1892 | Stafford et al. | 384/550 |
| 2,488,929 | 11/1949 | Palumbo | 384/461 |
| 4,133,587 | 1/1979 | Kume | 384/461 |

Primary Examiner—Lenard A. Footland
Attorney, Agent, or Firm—Kerkam, Stowell, Kondracki, & Clarke

[57] ABSTRACT

Bearing assemblies use serial bearings in order to extend the operational speeds for the bearings. Speed distribution planetary gears are mounted upon an intermediate ring disposed between two other rings. Each of the rings has bearing surfaces which are separated from adjacent bearing surfaces by ball-bearings or other bearings. The planetary gears mesh with gear teeth upon the first and second rings so as to cause rotation of the intermediate ring at a speed intermediate the relative speed between the two other rings. The speed distribution planetary gears may be used in a serial thrust bearing assembly serial radial bearing assembly, or a serial radial thrust bearing assembly.

30 Claims, 9 Drawing Figures

SERIAL BEARING ASSEMBLY

BACKGROUND OF THE INVENTION

This invention relates to bearings and, more particularly, bearing assemblies having bearings arranged in serial fashion.

The use of anti-friction bearings is well-known. Such bearings permit free relative motion between different parts of a machine. The bearings may hold or guide moving machine parts, while simultaneously minimizing energy-wasteful friction. Additionally, the bearings minimize wear on the machine parts, which wear may change the dimensions of the machine parts rendering them useless.

The operation of bearings are limited by at least two factors. Specifically, the working specification for a high load, high speed bearing is usually specified by the product of the maximum total load P times the maximum speed V. For a bearing with a given PV value, one can increase the working speed under a reduced load and, likewise, one can increase the load under a reduced speed. However, in either case of reducing the speed or the load, certain maximum limits of speed and load also apply.

When a bearing is used in a particularly high speed or high load application, special materials and constructions have often been used in order to minimize the possibility of failure of the bearing. However, such special materials, extra high quality tolerance levels, or other special constructions are often quite costly. Further, special arrangements or constructions are often complex, difficult to assemble, and subject to other disadvantages. For a bearing assembly having a single bearing mechanism, binding or jamming of the bearing mechanism results in complete failure of the bearing assembly.

In order to deal with high speed bearing requirements, various compound bearing arrangements have been developed. Such bearing arrangements use at least two sets of bearings, each set bearing between two different surfaces.

The following U.S. patents are illustrative of bearing designs including a plurality of sets of bearings:

| U.S. Pat. No. | Inventor | Issue Date |
|---|---|---|
| 1,366,966 | Spear | Feb. 1, 1921 |
| 1,433,014 | Kennedy | Oct. 24, 1922 |
| 1,494,695 | McCluskey | May 20, 1924 |
| 1,506,856 | McCluskey | Sep. 2, 1924 |
| 1,748,174 | Hirvonen | Feb. 25, 1930 |
| 1,742,841 | Witthofft | Jan. 7, 1930 |
| 1,798,529 | Foley | Mar. 31, 1931 |
| 2,647,807 | Brunstrum | Aug. 4, 1953 |
| 3,452,349 | Wood | Jun. 24, 1969 |
| 3,597,029 | Marcum | Aug. 3, 1971 |
| 4,045,100 | Beauchet | Aug. 30, 1977 |

The Spear patent shows a roller conveyor wherein the rollers are mounted upon a ball-bearing assembly having a plurality of ball bearings radially spaced and disposed upon opposite sides of a member.

The Kennedy patent shows a compound bearing assembly having two sets of ball bearings at opposite ends of a front axe of an automobie. Each set of ball bearings is axially and radially spaced from an adjacent set of ball bearings. An alternate compound bearing uses ball bearings which are radially spaced, but in a common plane.

The McCluskey '695 patent shows a bearing arrangement using a plurality of radially spaced roller bearings disposed in a common plane.

The McCluskey '856 patent shows a radial serial bearing having ball inlets to facilitate insertion of ball bearings in the assembly.

The Hirvonen patent shows a compound bearing arrangement for a spindle. Gears and eccentrics are used to minimize wear.

The Witthofft patent discloses a bearing arrangement having a plurality of radially spaced balls in a concentric arrangement and having a radially movable locking member to lock the ball bearings in position.

The Foley patent shows a roller bearing having a plurality of gears which are adapted to cause an intermediate ring to move in a direction opposite to the rotation of shaft. As shown in FIG. 3, gear teeth are located on a plurality of annular members.

The Brunstrum patent shows a bearing arrangement using a plurality of concentrically arranged ball bearings and having a structure such that one set of bearings is used when the shaft is turning in one direction and the other set of bearings is used when the shaft is turning in the opposite direction.

The Wood patent shows a plurality of concentrically arranged ball bearings. The arrangement includes a mechanism whereby one set of the ball bearings is held in reserve and only used upon failure of the other set of ball bearings.

The Marcum patent discloses a planetary bearing assembly wherein a plurality of radially spaced bearings are used for high speed installations.

The Beauchet patent discloses a concentric anti-friction bearing assembly wherein bearing elements running in races of different diameters are disposed approximately in the same radial plane.

Additionally, the French patent 1,284,704 of Gatserelia issued on July 4, 1962 shows different arrangements in which various pluralities of ball bearings are radially offset in concentric planes and/or disposed in parallel planes. As shown in FIG. 2, three sets of bearings may be arranged concentrically in a common plane with three additional sets of bearings arranged concentrically in another plane axially offset from the first plane.

Although the above and other bearing designs have been generally useful at minimizing friction, they have been subject to numerous disadvantages. In particular, the cost, ease of construction, and operational characteristics have often been less than desirable. Further, they have generally lacked the ability to consistently distribute speed between various of the machine parts. Without any arrangement to accurately and consistently distribute speed or relative motion throughout several of the machine parts, the limit of maximum speed for such bearing assemblies has been lower than desirable.

SUMMARY OF THE INVENTION

A primary object of the present invention is to provide a new and improved serial bearing assembly.

A more specific object of the present invention is to provide a serial bearing assembly which has superior operational characteristics such as reduced friction, increased working speed limit, and ability to handle relatively high loads.

Another object of the present invention is to provide a serial bearing assembly which will have superior construction characteristics such as reduced manufacturing cost, reduced weight/size ratio, facilitation of high standards of tolerance, and not necessitating special materials (although special materials such as ceramics or plastics could be used in conjunction with the present invention).

A further object of the present invention is to provide a serial bearing assembly which will provide sturdy support to the rotating elements.

A still further object of the present invention is to provide a bearing assembly wherein failure of a single bearing means, such as a single set of ball bearings rolling in common races, will not result in complete failure of the assembly.

Yet another object of the present invention is to provide a bearing assembly which may be realized by use of different anti-friction methods such as ball-bearings or other roller elements, hydrostatic, hydrodynamic, aerodynamic, magnetic repulsion, magnetic fluid, etc.

The above and other objects of the present invention which will become apparent as the description proceeds are realized by a serial bearing assembly comprising (a) a first member having a first bearing surface; (b) a second member having a second bearing surface, the first member being movable relative to the second member; (c) an intermediate member movable relative to the first member and movable relative to the second member, the intermediate member having a first intermediate bearing surface facing the first bearing surface and a second intermediate bearing surface facing the second bearing surface; (d) first bearing means between the first bearing surface and the first intermediate bearing surface to allow relative movement between the first bearing surface and the first intermediate bearing surface; (e) second bearing means between the second bearing surface and the second intermediate bearing surface to allow relative movement between the second bearing surface and the second intermediate bearing surface; and (f) speed distribution means connected to the first member, the second member, and the intermediate member and operable such that movement of the first member in a given direction at a given speed relative to the second member will drive the speed distribution means which causes the intermediate member to move in the given direction at a fraction of the given speed relative to the second member; and wherein the speed distribution means includes a first wheel drivingly engaged to the second member and pivotably mounted to the intermediate member. Preferably, the first wheel is a first gear, and both the first member and the second member have gear teeth meshed to the first gear. The speed distribution means includes a second gear pivotably mounted to the intermediate member and meshed to the first member gear teeth and the second member gear teeth. The first member is annular. Each of the first bearing surface, second bearing surface, first intermediate bearing surface, and second intermediate bearing surface is annular and have a common central axis. The first member is rotatable relative to the second member and the intermediate member is rotatable relative to the first member and rotatable relative to the second member. The first wheel directly contacts the first member and the second member. In one embodiment, the serial bearing assembly is a thrust bearing assembly and the first bearing surface, second bearing surface, first intermediate bearing surface, and second intermediate bearing surface lie in parallel offset planes, the parallel offset planes being perpendicular to the common central axis. The first bearing means may comprise a plurality of first ball-bearings, and the second bearing means may comprise a plurality of second ball-bearings. In another embodiment, the serial bearing assembly is a radial bearing assembly, the intermediate member is annular, and the first member, intermediate member, and second member all lie in a common plane perpendicular to the common central axis. A specific type of radial bearing assembly may further comprise an annular third member having an annular third bearing surface and third bearing means; and wherein the second member has a supplemental bearing surface, the third bearing means being between the third bearing surface and the supplementary bearing surface, and the speed distribution means may further comprise a second wheel drivingly engaged to the first member and the third member and pivotably mounted to the second member. The speed distribution means may further comprise a third wheel pivotably mounted to the second wheel on a common pivot point with the second wheel and wherein the second wheel is drivingly engaged to the member by way of the third wheel. Each of the first, second, and third wheels may be a planetary gear rotating about the common central axis. The first bearing means may comprise a plurality of first bearing elements which rollingly contact the first bearing surface and the first intermediate bearing surface. The second bearing means may comprise a plurality of second bearing elements which rollingly contact the second bearing surface and the second intermediate surface. Another embodiment is a radial thrust bearing assembly using tapered rollers.

The present invention may alternately be described as comprising the elements (a) through (f) discussed above and wherein the first member is annular, the intermediate member is annular; and each of the first bearing surface, second bearing surface, first intermediate bearing surface, and second intermediate bearing surface is annular and have a common central axis; and wherein the first member is rotatable relative to the second member, and the intermediate member is rotatable relative to the first member and rotatable relative to the second member; and the speed distribution means rotates about the common central axis upon rotation of the first member relative to the second member. The intermediate member rotates around the common central axis upon rotation of the first member relative to the second member at a common speed of rotation as the speed distribution means. The speed distribution means comprises a first planetary gear drivingly engaged to the first member and the second member and pivotably mounted to the intermediate member. The speed distribution means may further comprise a second planetary gear drivingly engaged to the first member and the second member and pivotably mounted to the intermediate member.

The present invention may alternately be described as including the elements (a) through (f) described above and wherein the first member is annular, the intermediate member is annular; and each of the first bearing surface, second bearing surface, first intermediate bearing surface, and second intermediate surface is annular and have a common central axis; and wherein the first member is rotatable relative to the second member and the intermediate member is rotatable relative to the first member and rotatable relative to the second member; and wherein the first bearing means comprises a plurality of first bearing elements which rollingly contact the first bearing surface and the first intermediate bearing surface; and the second bearing means comprises a plurality of second bearing elements which rollingly contact the second bearing surface and the second intermediate bearing surface. The speed distribution means rotates around the common central axis upon rotation of the first member relative to the second member.

BRIEF DESCRIPTION OF THE DRAWINGS

The above and other features of the present invention will be more readily understood when the following detailed description is considered in conjunction with the accompanying drawings wherein like characters represent like parts throughout the several views and in which.

DETAILED DESCRIPTION OF THE PREFERRED EMBODIMENTS

Figure 1:
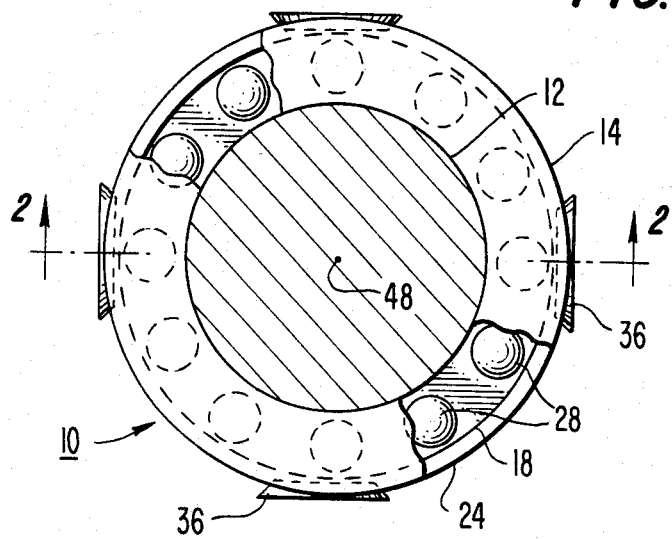
FIG. 1 shows a front view of a serial thrust bearing assembly according to the present invention.
Figure 2:
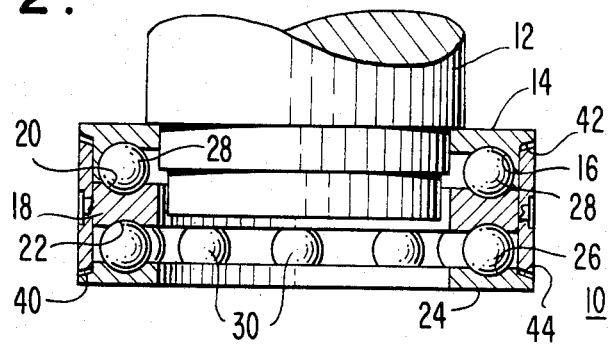
FIG. 2 shows a cross-section view taken along lines 2—2 of the assembly of FIG. 1.
Figure 3:
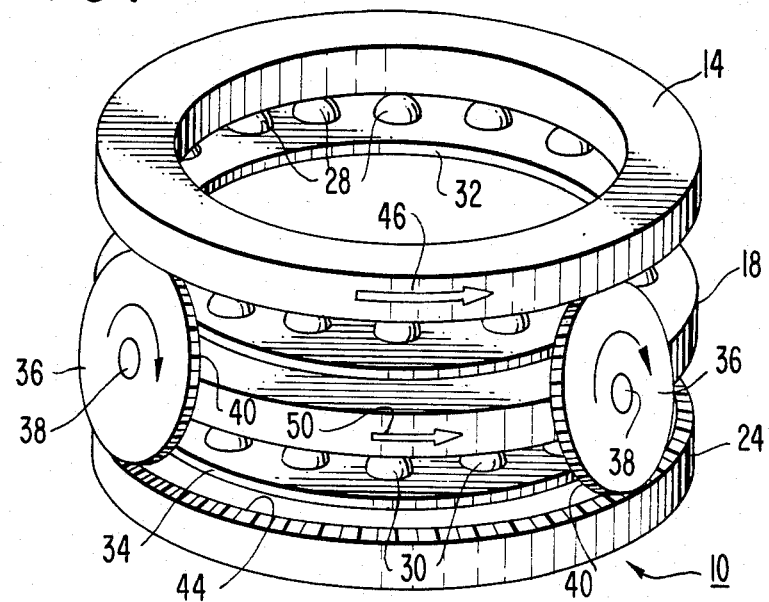
FIG. 3 shows a perspective view of the assembly of FIG. 1.

With reference now to FIGS. 1, 2, and 3, a serial thrust bearing assembly 10 of the present invention will be discussed in detail.

The thrust bearing assembly 10 includes a first member 14 having a first bearing surface 16. An intermediate member 18 including first intermediate bearing surface 20 and second intermediate bearing surface 22 is spaced from the first member 14. Additionally, a second member 24 is spaced from the intermediate member 18 and includes a second bearing surface 26.

As shown, the first member 14, second member 24, and intermediate member 18 is each a ring, whereas each of the bearing surfaces is an annular bearing surface.

The ring 14 is separated from the intermediate ring 18 by a first bearing means comprising the ball bearings 28 disposed between the oppositely facing bearing surfaces 16 and 20. In similar fashion, the intermediate ring 18 is separated from the other outer ring 24 by the second bearing means or ball bearings 30 disposed between oppositely facing bearing surfaces 22 and 26. A first ball separator 32 and a second ball separator 34 may be used to separate the respective first and second ball bearings 28 and 30. For ease of illustration, the ball separators 32 and 34 are shown in FIG. 3 only.

A plurality of wheels 36 are pivotably mounted upon the intermediate ring 18 and serve as a speed distribution means. In particular, each of the wheels 36 is a planetary gear mounted at a central pivot point 38 to the intermediate ring 18. In the embodiment shown in FIGS. 1-3, there are four such wheels or planetary gears 36, each spaced 90° from the adjacent gears 36. However, two, three, or another number of such gears could be used. Although one gear could be used, it is preferable to have at least two.

Each of the planetary gears 36 includes beveled gear teeth 40 mating with beveled first and second ring gear teeth 42 and 44 disposed respectively in an annular pattern on the first ring 14 and in an annular pattern on the second ring 24.

Standard well-known arrangements may be used for sealing and lubricating the bearing assembly 10 of the present invention as well as the other embodiments of the present invention. Accordingly, because the use of standard housings and sealing and lubrication arrangements are well-known in the art, these need not be described in detail and they are not shown in any of the present Figures.

The operation of the thrust serial bearing assembly 10 of the present invention is relatively straightforward. The first ring or member 14 rotates in the direction shown by arrow 46 in FIG. 3 at a given velocity relative to the fixed or stationary second ring 24. As the ring 14 rotates, its annular ring gear teeth 42 cause each of the planetary gears 36 to rotate in a clockwise direction (as seen in FIG. 3). In addition to engaging the gear teeth 42 of ring 14, the gear teeth 40 of the planetary gears 36 engage the gear teeth 44 of the lower or second ring 24, thereby causing the planetary gears 36 to rotate or "orbit" around a common central axis (point 48 in FIG. 1). Because the planetary wheels or gears 36 will "orbit" around the common central axis 48 (common to the bearing surfaces, first ring 14, second ring 24, and intermediate ring 18), the planetary gears 36 will in turn cause the intermediate ring 18 to rotate in the same direction and with lesser magnitude than the first member or first ring 14. The rotation of the intermediate member or ring 18 is illustrated schematically by the arrow 50.

It will thus be seen, that the planetary gears 36, pivotably mounted to the intermediate ring 18, cause the intermediate ring 18 to rotate in the same direction and with lesser magnitude than the rotation of the first ring 14. For example, if the axle 12 is spinning at 20,000 RPM relative to the stationary ring 24, the moving or first ring 14 would rotate at 20,000 RPM relative to the stationary ring 24 by virtue of a standard connection such as a separate ring with set screws (not shown) to hold the ring 14 to shaft 12. (Alternatively, the shaft 12 may be rotatable relative to the first ring 14.) However, the planetary gears 36 would rotate around the central axis of the shaft such that the ring 14 that the intermediate ring 18 is moving at, for example, about 10,000 RPM relative to the fixed ring 24. Accordingly, the fast moving ring 14 would only be moving at about 10,000 RPM relative to the intermediate ring 18, whereas the intermediate ring 18 would only be rotating at about 10,000 RPM relative to the fixed ring 24. The present serial bearing assembly effectively cuts the relative linear speed (i.e., between adjacent rings) in half. For the thrust bearing assembly 10 having equal radii, the RPM would be halved. However, differences in radii would change the RPM distribution in accord with the detailed discussion below. Accordingly, the arrangement can handle higher speeds of rotation than a simple bearing. Most importantly, the wheels or planetary gears 26 provide a speed distribution means to ensure a proper distribution of speed between the three rings used for the assembly 10. Although the intermediate ring 18 would preferably rotate at one half the speed of the fast ring 14 for the preferred embodiment of FIGS. 1-3, variations in the spacing of the gear teeth 40, 42, and 44 and/or more complex gearing arrangements could be used to provide alternate distributions of speed.

Figure 4:
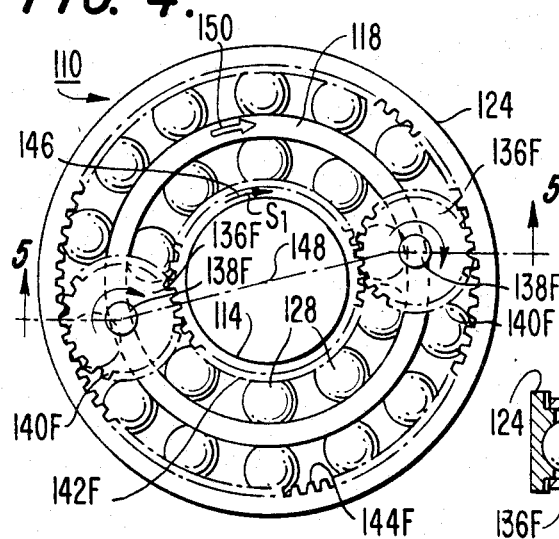
FIG. 4 shows a front view of a serial radial bearing assembly according to the present invention.
Figure 5:
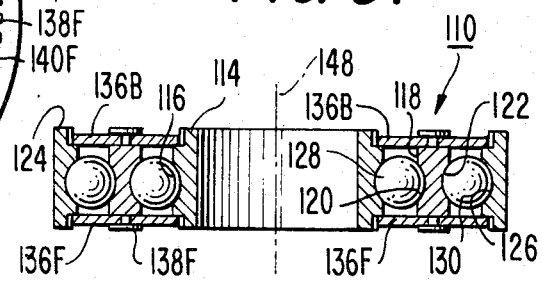
FIG. 5 shows a cross-section view taken along lines 5—5 of the radial assembly of FIG. 4.

With reference now to FIGS. 4 and 5, a serial radial bearing assembly 110 according to the present invention will be described. FIG. 4 shows a plane view of the radial bearing assembly 110, whereas FIG. 5 shows a cross-section view taken along lines 5—5 of FIG. 4. The components of the radial bearing assembly 110 have been labeled in the "100" series with the same last two digits as the corresponding component in the thrust bearing assembly 10 shown in FIGS. 1-3. For ease of illustration, a shaft 12 such as shown in FIGS. 1 and 2 is not shown in the embodiment of FIGS. 4 and 5, but it will be readily understood that a shaft would extend along the common central axis 148.

As shown, the radial bearing assembly 110 includes a first member or ring 114 having a first bearing surface 116 facing a first intermediate bearing surface 120 on an intermediate member or ring 118. The intermediate ring 118 includes a second intermediate bearing surface 122 facing a second bearing surface 126 disposed on a second or outer ring member 124. The bearing surfaces 116 and 120 are separated by first bearing means ball-bearings 128, whereas the bearing surfaces 122 and 126 are separated by second bearing means ball-bearings 130. (A ball separator such as separators 32 and 34 could be used for each of the plurality of ball bearings, but these are not shown to allow better illustration of the other components.) As will be readily apparent from the drawings, each of the ring surfaces is annular and centered about the common central axis 148 as are the three rings, 114, 118, and 124. Mounted upon the intermediate ring 118 are two front planetary gears 136F and two back planetary gears 136B. Each of the planetary gears is pivotably mounted on the intermediate ring 118 at a corresponding pivot point 138F or 138B and includes corresponding gear teeth such as 140F. The gear teeth disposed on the back planetary gears 136B are not shown in the drawings and as the structure of FIG. 4 is identical in front and back views, the discussion which follows will emphasize the operation and structure with respect to the front planetary gears 136F. It will be readily understood that the back planetary gears 136B operate in identical fashion. The gear teeth 140F mesh with a corresponding annular pattern of gear teeth 142F on the inner ring 114 and, likewise, mesh with a corresponding annular pattern of gear teeth 144F on the outer ring or second member 124.

The operation of the embodiment of FIGS. 4 and 5 is relatively straightforward. In particular, the radial serial bearing assembly 110 will operate in similar fashion to a regular radial bearing assembly except that the planetary gears 136F and 136B will serve as a speed distribution means to allow the bearing assembly 110 to work at higher speeds than would otherwise be the case. In particular, if the inner ring 114 is rotating at 20,000 RPM (by way of a shaft), this will in turn cause the planetary gears 136F and 136B to rotate or "orbit" around the common central axis 148 in addition to pivoting about their respective pivot points fixed on the intermediate ring 118. Accordingly, the intermediate ring 118 will likewise be moved in the same direction as the ring 114 (see arrows 146 and 150) and at one half the linear velocity. The rotation of the intermediate ring 118 at about 10,000 RPM, for example, effectively means that the relative speed between ring 114 and intermediate ring 118 is about 10,000 RPM and the relative speed between the intermediate ring 118 and the ring 124 (which would be stationary) is about 10,000 RPM. For a given set of materials, constructions, and tolerance levels, the radial bearing assembly 110 will thus be able to operate at a higher speed than for a regular radial bearing assembly. Also, and as with other embodiments of the invention, binding or failure of either one of the bearing means 128 or 130 will not cause total failure of the assembly 110 provided that the other of bearing means is sufficient to operate under the then-current speed and load. As with all of the bearing assemblies of the present invention, lubrication and sealing may be arranged by well-known techniques.

Figure 6:
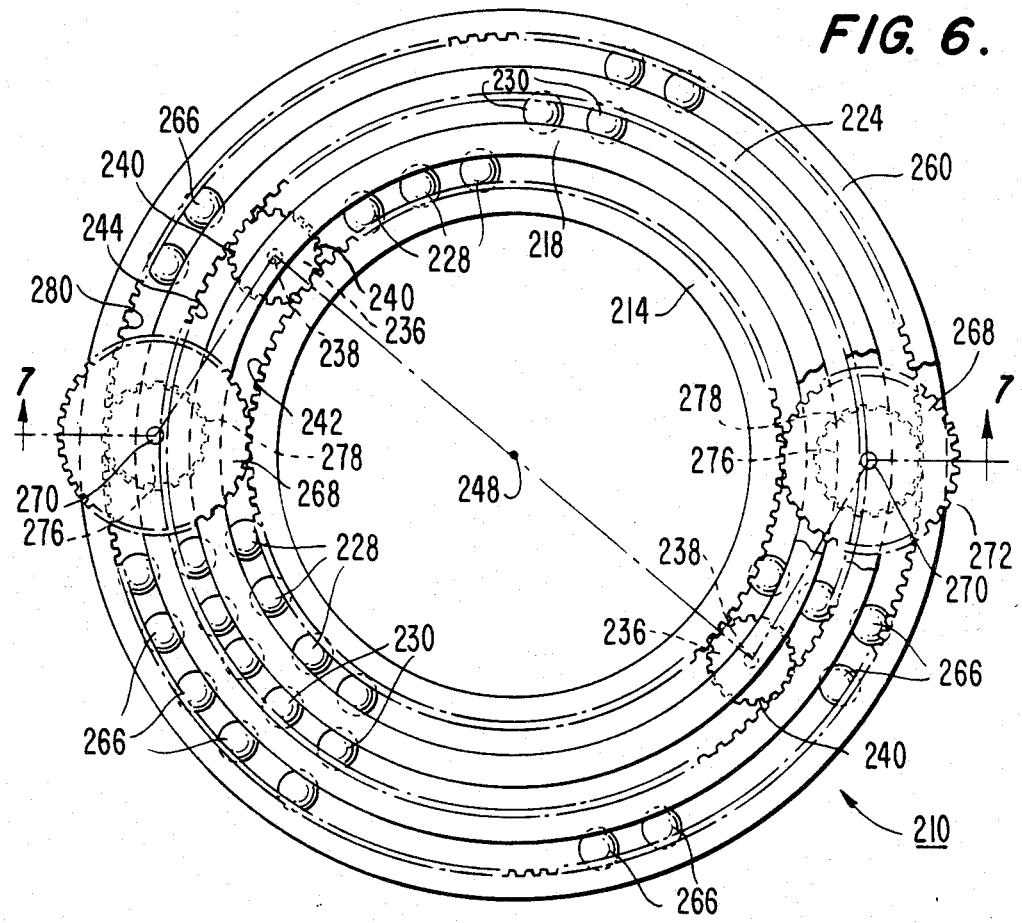
FIG. 6 shows a front view of an alternate radial bearing assembly according to the present invention.
Figure 7:
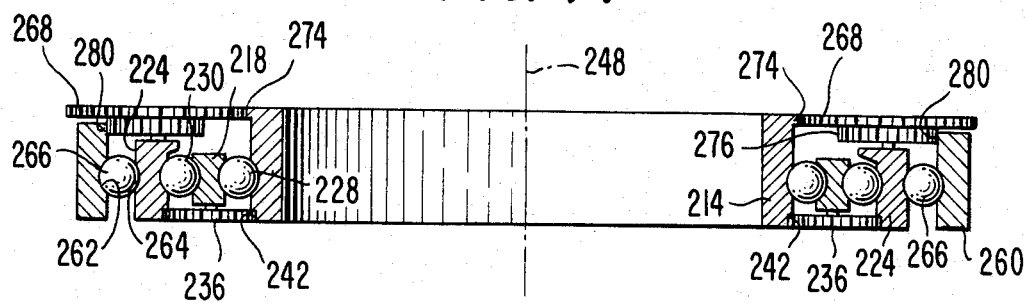
FIG. 7 shows a cross-section view of the radial assembly of FIG. 6.

FIGS. 6 and 7 show an alternate radial bearing assembly 210 according to the present invention. Each of the components of the radial bearing assembly 210 has been labeled in the "200" series with the same last two digits as the corresponding component (if any) of the previous embodiments. Basically, the radial bearing assembly 210 involves a more complicated version of the radial bearing assembly 110 such that planetary gears are mounted on different moving rings.

The first or inner member 214 (which would be rotatable with a shaft, not shown) is separated from an intermediate member or ring 218 by the ball-bearing or first bearing means 228. In similar fashion, a second member or ring 224 is separated from the intermediate ring 218 by the bearing means or ball bearings 230. Two planetary gears 236 are pivotably mounted at pivot points 238 to the front of the intermediate ring 218. Each of the planetary gears 236 include gear teeth 240 which mesh with annular gear teeth 242 and 244 disposed at the respective rings 214 and 224. Accordingly, the planetary gears 236 will rotate around the common central axis 248 and distribute the speed between the inner ring 214, intermediate ring 218, and the ring 224 in the same fashion as the distribution of the speed between rings 114, 118 and 124 of the embodiment of FIGS. 4 and 5. The ball bearings 228 and 230 may also have ball separators (not shown) and it will be readily appreciated that the rings 214, 218, and 224 have annular bearing surfaces in similar fashion to the surfaces for the embodiment of FIGS. 4 and 5.

The embodiment of FIGS. 6 and 7 is different than the embodiment of FIGS. 4 and 5 in that it includes a third member 260 having an annular third bearing surface 262 facing a supplementary bearing surface 264 disposed on the outside of the second member 224. The supplementary bearing surface 264 is separated from the third bearing surface 262 by third bearing means ball-bearings 266. If desired, these ball bearings may include a ball separator (not shown). In addition to including the extra outer ring and extra outer ball bearing means 266, the embodiment 210 includes a pair of planetary gears 268 mounted to the second member or ring 224 at pivot points 270 (for ease of illustration, parts have been broken away from FIG. 6 so as to better illustrate the planetary gears 268 which are disposed at the back of the embodiment 210). Each of the planetary gears 268 includes gear teeth 272 adapted to mesh to corresponding gear teeth 274 disposed in an annular pattern about the back of the ring 214. It will thus be appreciated that the ring 214 has front gear teeth 242 (FIG. 6) and back gear teeth 274 (FIG. 7) which respectively engage the planetary gears 236 and 268.

The planetary gears 268 do not directly engage the outermost or third ring 260. Instead, each of the planetary gears 268 is mounted and connected for common rotation with a corresponding smaller planetary gear 276 having teeth 278 which mesh with teeth 280 disposed in an annular pattern about the ring 260. In generally the same fashion as the planetary gears 236 distribute speed between rings 214, 218, and 224, the planetary gears 268 and 276 rotate together to distribute speed between the rings 214, 224, and 260. Each of the gears 236, 274, and 276 may be respectively considered to be a first wheel or gear, a second wheel or gear, and a third wheel or gear.

The embodiment of FIGS. 6 and 7 is a triple serial bearing wherein three bearing sets of similar loading rate and speed limit are serially arranged. The distribution of speed will depend upon the particular gear ratios used for the first planetary gears 236, second planetary gears 268, and third planetary gears 276 and their cooperating gear teeth of the rings 214, 224, and 260.

The operation of the embodiment of FIGS. 6 and 7 is generally similar to that of the embodiment of FIGS. 4 and 5 except there is an additional bearing in the serial arrangement. The rings 214, 218, 224, and 260 form runners for the ball bearings in between the rings. The ball bearings would rotate in the same direction as the shaft (not shown, would extend through and be connected to innermost ring 214). The planetary gears 268 and 276 rotate about the same pivot 270 which is fixed on the ring 224. The gear 268 meshes to the gear teeth 274 on ring 214 and has a radius twice the radius of the gear 276 which meshes two gear teeth 280 on outer ring 260. Accordingly, when the outer periphery of the inner ring 214 is rotating at a linear speed of 100 meters per second, this will cause the ring 224 to rotate at one third of that speed (approximately 33.3 meters per second).

For the example above, the relative speed between the ring 214 and ring 224 will be 100 meters per second minus 33.3 meters per second which equals 66.7 meters per second. The planetary gears 236 mounted upon ring 218 will distribute the relative speed between the rings 214, 218, and 224 in essentially identical fashion to the operation of the embodiment of FIGS. 4 and 5. Since the relative speed between rings 214 and 224 is about 67 meters per second, the gears 236 will approximately equally distribute this between the adjacent rings. Accordingly, the ring 214 will have a relative speed of about 33 meters per second with respect to the ring 218, whereas the ring 218 will have a relative speed of about 33 meters per second with respect to the ring 224. Considering that the planetary gear arrangement of gears 268 and 276 causes ring 224 to have a relative speed of about 33 meters per second with respect to the fixed outer ring 260, it will be appreciated that the speed is distributed with approximately one third between each adjacent ring. Thus, one may use this bearing arrangement for higher speeds than would otherwise be the case. As with the other embodiments, the sealing and lubrication of this triple radial bearing assembly may use any of numerous well-known techniques.

Figure 8:
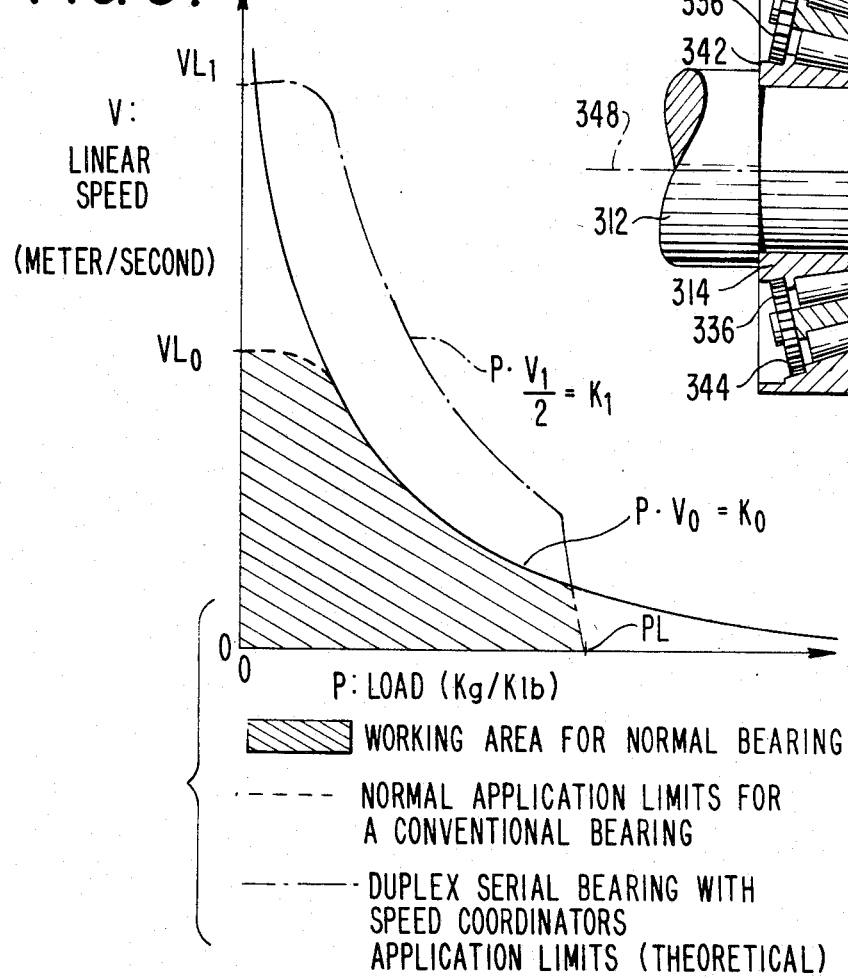
FIG. 8 shows a graph illustrating the working constraints of a normal bearing and the operational conditions for an embodiment of the present invention.

With reference now to FIG. 8, the operational characteristics of the present invention will be compared to those of a conventional bearing. In particular, a conventional bearing is limited by the product of its load P times its velocity $V_O$. That product is equal to a constant $K_O$ so as to define the illustrated curve on the FIG. 8 chart of velocity versus load. Additionally, the normal application limits for a conventional bearing might be between a maximum load PL and a maximum or upper limit on the velocity $VL_O$ such that its normal working area is illustrated by the cross hatched area in FIG. 8.

Considering that the linear speed is the linear speed between adjacent rings of the bearing, it should be appreciated that the speed coordination or distribution for the duplex serial bearing such as FIGS. 4 and 5 of the present invention will be capable of operating at higher speeds. Considering that the duplex bearing of FIGS. 4 and 5, for example, will effectively cut the speed between the fast moving ring in halves, the operational characteristics of the serial bearing will be defined by the product of the load times one half of the speed $V_1$. That product will be equal to a constant $K_1$. Assuming that the same material, machining, tolerance levels, etc. are used for the serial bearing as for the conventional bearing, the constant $K_1$ will be equal to the constant $K_O$ the velocity $V_1$ will be equal to twice the velocity $V_O$. Accordingly, the duplex serial bearing may operate within the curve as shown and between the upper load limit PL and an upper speed limit $VL_1$. That upper speed limit will be approximately twice the upper speed limit of the conventional bearing.

The calculation of the linear speed division and angular velocity for the embodiment of FIGS. 4 and 5 may aid in understanding the present invention. The following variables, several of which are represented schematically in FIG. 4, are useful for explaining the present invention:

Variable: meaning $R_1$(mm) or (inch): Radius of inner ring pitch circle $R_2$(mm) or (inch): Radius of intermediate ring (from the center of bearing to the center of planetary gear)

$V_1$(meter/second) or (ft/second): linear speed at inner ring pitch circle $V_2$(meter/second) or (ft/second): linear speed of planetary gear center $S_1$(rpm): turning speed of inner ring $S_2$(rpm): turning speed of intermediate ring $w_1$(arc/second): angular speed of inner ring $w_2$(arc/second): angular speed of intermediate ring General relationships for either sets of variables (i=1 or b 2) are as follows:

$$S_i = \frac{w_i}{2\pi} \times 60 = \frac{V_i \times 1000}{2\pi R_i} \times 60 \tag{1}$$

$$\frac{V_i}{R_i} \propto w_i \tag{2}$$

Assuming that we want the planetary gear center (and thus the intermediate ring 118) to move at one half the speed of the inner ring 114, this leads to:

$$V_1 = 2V_2 \tag{3}$$

$$R_1 w_1 = 2R_2 w_2 \tag{4}$$

$$w_1/w_2 = 2R_2/R_1 \tag{5}$$

but $$w_1 w_2 = S_1 S_2 \tag{6}$$

$$2R_2/R_1 = S_1/S_2 \tag{7}$$

For a serial radial bearing, angular contact bearing, or beveled bearing, equation 7 above may be used to obtain the intermediate rotary speed $S_2$ from knowledge of the other three variables of the equation.

For a serial thrust bearing, the equation 7 would also hold true and $R_1$ is equal to $R_2$. Therefore, $S_1$ equals 2 $S_2$.

In any case, variations in the radii and/or gearing arrangement may be used to modify the relationship of speed between the various members or rings on any of the embodiments of the present invention.

Figure 9:
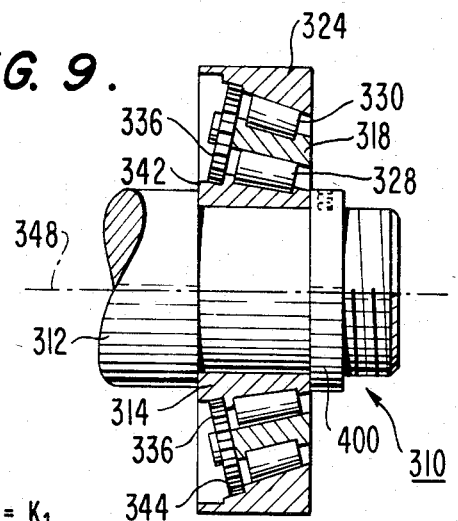
FIG. 9 shows a cross-section view of a radial thrust bearing assembly embodiment of the present invention.

FIG. 9 shows a radial thrust bearing assembly 310 constructed in accord with the present invention. The assembly includes components numbered in the "300" series with the same last two digits as the corresponding part, if any, of the embodiment of FIGS. 4 and 5. The bearing assembly 310 includes an inner ring 314, an intermediate ring 318, and an outer ring 324 with tapered rollers 328 and 330 serving as bearing means in somewhat similar fashion to the ball bearings 128 and 130 of FIGS. 4–5. However, because the rollers 328 and 330 are tapered to be narrower at their right (view of FIG. 9) ends, the assembly 310 can bear a thrust load, the assembly 310 being held in place by a retainer ring 400 having threads (not shown) and a set screw. The speed distribution means between the rings 314, 318 and 324 include speed coordinating planetary gears 336 pivotably mounted upon the intermediate ring 318 and meshing to teeth 342 and 344 respectively disposed upon the inner ring 314 and the outer ring 324. The gears 336 may be beveled and disposed at an angle with respect to the axis 348 of shaft 312. The planetary gears 336 operate in the same fashion as the gears 136(F) and 136(B) in the embodiment of FIGS. 4–5.

As an alternative to the serial radial-thrust bearing assembly 310 of FIG. 9, the planetary gears 336 may be mounted in a plane perpendicular to the common central axis 348. It will be readily appreciated that the tapered roller bearings in either case could be mounted within a bearing cage (not shown) of various known constructions.

An advantage of numerous of the embodiments of the present invention is that failure of a single bearing means will not result in complete failure of the assembly. In order to realize that advantage, the planetary gears used as the speed distribution means may be made of a relatively weak material such as plastic. Accordingly, the teeth of the planetary gears may be ripped off if one of the main bearings is jammed. Although this is a self-destruction mechanism for the planetary gears, it is a safety feature for the main bearing assembly. The rupture strength of the teeth of the planetary gears can be designed as ten times the starting torque needed to drive the intermediate ring.

In some constructions, the planetary gear speed coordination arrangement or friction wheels may be designed to bear a load at low speed or during a power supply failure. Because aerodynamic and hydrodynamic bearings need some minimum speed to function and hydrostatic, aerostatic and magnetic bearings need continuous power supply for the pump or magnetic coils, this feature may be useful in connection with embodiments using these bearing means. The insertion of planetary gears or friction wheels may support the bearings at low speed or upon power failure and serve to maintain the necessary spacing between runner rings when the machine is stalled. At high speed, the main bearing may take over the load and the planetary gears or friction wheels will only function as speed coordinators.

Although specific constructions, and embodiments have been shown for the present invention, it is to be understood that these are for illustrative purposes only. Various modifications and adaptations will be readily apparent to those of ordinary skill in the art. For example, it will be readily apparent that the use of a speed coordination or distribution means between adjacent members or rings may be accomplished with bearing means other than the ball bearings shown in the drawings. Specifically, the use of needle-roller bearings instead of the ball-bearings of the present invention will be an apparent modification. More generally, the use of various anti-friction methods such as hydrostatic, hydrodynamic, aerodynamic, magnetic repulsion, magnetic fluids, etc., instead of the ball-bearings, could be used to bear between the adjacent members, which members are shown as rings for the preferred embodiments. In other words, the speed distribution means is quite compatible with these various other anti-friction methods or bearing means. Further, although the preferred embodiments use planetary gears as the speed distribution means, friction wheels or other arrangements could be used for the speed distribution means. Accordingly, the scope of the present invention should be determined with reference to the claims appended hereto.

What is claimed is:

1. A serial bearing assembly comprising:
   (a) a first member having a first bearing surface;
   (b) a second member having a second-bearing surface, said first member being movable relative to said second member;
   (c) an intermediate member movable relative to said first member and movable relative to said second member, said intermediate member having a first intermediate bearing surface facing said first bearing surface and a second intermediate bearing surface facing said second bearing surface;
   (d) first bearing means between said first bearing surface and said first intermediate bearing surface to allow relative movement between said first bearing surface and said first intermediate bearing surface;
   (e) second bearing means between said second bearing surface and said second intermediate bearing surface to allow relative movement between said second bearing surface and said second intermediate bearing surface; and
   (f) speed distribution means connected to said first member, said second member, and said intermediate member and operable such that movement of said first member in a given direction at a given speed relative to said second member will drive said speed distribution means which causes said intermediate member to move in said given direction at a fraction of said given speed relative to said second member; and wherein said speed distribution means includes a first wheel drivingly engaged to said first member and said second member and pivotably mounted to said intermediate member.

2. The serial bearing assembly of claim 1 wherein said first wheel is a first gear, and both of said first member and said second member have gear teeth meshed to said first gear.

3. The serial bearing assembly of claim 2 wherein said speed distribution means includes a second gear pivotably mounted to said intermediate member and meshed to said first member gear teeth and said second member gear teeth.

4. The serial bearing assembly of claim 1 wherein said first member is annular; and each of said first bearing surface, second bearing surface, first intermediate bearing surface, and second intermediate bearing surface is annular; and have a common central axis and wherein said first member is rotatable relative to said second member and said intermediate member is rotatable relative to said first member and rotatable relative to said second member.

5. The serial bearing assembly of claim 4 wherein said first wheel directly contacts said first member and said second member.

6. The serial bearing assembly of claim 4 wherein said serial bearing assembly is a thrust bearing assembly and said first bearing surface, said second bearing surface, said first intermediate bearing surface, and said second intermediate bearing surface lie in parallel offset planes, said parallel offset planes being perpendicular to said common central axis.

7. The serial bearing assembly of claim 6 wherein said first bearing means comprises a plurality of first ball-bearings, and said second bearing means comprises a plurality of second ball-bearings.

8. The serial bearing assembly of claim 4 wherein said serial bearing assembly is a radial thrust bearing assembly and said first and second bearing means each comprises a plurality of tapered rollers.

9. The serial bearing assembly of claim 4 wherein said serial bearing assembly is a radial bearing assembly, said intermediate member is annular; and said first member, said intermediate member, and said second member all lie in a common plane perpendicular to said common central axis.

10. The serial bearing assembly of claim 9 further comprising an annular third member having an annular third bearing surface and third bearing means; and wherein said second member has a supplementary bearing surface, said third bearing means being between said third bearing surface and said supplementary bearing surface; and said speed distribution means further comprises a second wheel drivingly engaged to said first member and said third member and pivotably mounted to said second member.

11. The serial bearing assembly of claim 10 wherein said speed distribution means further comprises a third wheel pivotably mounted to said second member on a common pivot point with said second wheel and wherein said second wheel is drivingly engaged to said third member by way of said third wheel.

12. The serial bearing assembly of claim 11 wherein each of said first, second, and third wheels is a planetary gear rotating about said common central axis.

13. The serial bearing assembly of claim 1 wherein said first bearing means comprises a plurality of first bearing elements which rollingly contact said first bearing surface and said first intermediate bearing surface; said second bearing means comprises a plurality of second bearing elements which rollingly contact said bearing surface and said second intermediate bearing surface.

14. A serial bearing assembly comprising:
(a) a first member having a first bearing surface;
(b) a second member having a second bearing surface, said first member being movable relative to said second member;
(c) an intermediate member movable relative to said first member and movable relative to said second member, said intermediate member having a first intermediate bearing surface facing said first bearing surface and a second intermediate bearing surface facing said second bearing surface;
(d) first bearing means between said first bearing surface and said first intermediate bearing surface to allow relative movement between said first bearing surface and said first intermediate bearing surface;
(e) second bearing means between said second bearing surface and said second intermediate bearing surface to allow relative movement between said second bearing surface and said second intermediate bearing surface; and
(f) speed distribution means connected to said first member, said second member, and said intermediate member and operable such that movement of said first member in a given direction at a given speed relative to said second member will drive said speed distribution means which causes said intermediate member to move in said given direction at a fraction of said given speed relative to said second member; and wherein said first member is annular, said intermediate member is annular; and each of said first bearing surface, second bearing surface, first intermediate bearing surface, and second intermediate bearing surface is annular; and have a common central axis; and wherein said first member is rotatable relative to said second member, and said intermediate member is rotatable relative to said first member and rotatable relative to said second member; and said speed distribution means rotates around said common central axis upon rotation of said first member relative to said second member.

15. The serial bearing assembly of claim 14 wherein said intermediate member rotates around said common central axis upon rotation of said first member relative to said second member at a common speed of rotation as said speed distribution means.

16. The serial bearing assembly of claim 15 wherein said first bearing means comprises a plurality of first bearing elements which rollingly contact said first bearing surface and said first intermediate bearing surface; and said second bearing means comprises a plurality of second bearing elements which rollingly contact said second bearing surface and said second intermediate bearing surface.

17. The serial bearing assembly of claim 14 wherein said speed distribution means comprises a first planetary gear drivingly engaged to said first member and said second member and pivotably mounted to said intermediate member.

18. The serial bearing assembly of claim 17 wherein said speed distribution means further comprises a second planetary gear drivingly engaged to said first member and said second member and pivotably mounted to said intermediate member.

19. The serial bearing assembly of claim 17 wherein said serial bearing assembly is a thrust bearing assembly and said first bearing surface, said second bearing surface, said first intermediate bearing surface, and said second intermediate bearing surface lie in parallel offset planes, said parallel offset planes being perpendicular to said common central axis.

20. The serial bearing assembly of claim 17 wherein said serial bearing assembly is a radial bearing assembly, said intermediate member is annular; and said first member, said intermediate member, and said second member all lie in a common plane perpendicular to said common central axis.

21. The serial bearing assembly of claim 20 further comprising an annular third member having an annular third bearing surface and third bearing means; and wherein said second member has a supplementary bearing surface, said third bearing means being between said third bearing surface and said supplementary bearing surface; and said speed distribution means further comprises a second wheel drivingly engaged to said first member and said third member and pivotably mounted to said second member.

22. A serial bearing assembly comprising:
(a) a first member having a first bearing surface;
(b) a second member having a second bearing surface, said first member being movable relative to said second member;
(c) an intermediate member movable relative to said first member and movable relative to said second member, said intermediate member having a first intermediate bearing surface facing said first bearing surface and a second intermediate bearing surface facing said second bearing surface;
(d) first bearing means between said first bearing surface and said first intermediate bearing surface to allow relative movement between said first bearing surface and said first intermediate bearing surface;
(e) second bearing means between said second bearing surface and said second intermediate bearing surface to allow relative movement between said second bearing surface and said second intermediate bearing surface; and
(f) speed distribution means connected to said first member, said second member and said intermediate member and operable such that movement of said first member in a given direction at a given speed relative to said second member will drive said speed distribution means which causes said intermediate member to move in said given direction at a fraction of said given speed relative to said second member; and wherein said first member is annular, said intermediate member is annular; and each of said first bearing surface, second bearing surface, first intermediate bearing surface, and second intermediate bearing surface is annular and have a common central axis; wherein said first member is rotatable relative to said second member and said intermediate member is rotatable relative to said first member and rotatable relative to said first member and rotatable relative to said second member; and wherein said first bearing means compises a plurality of first bearing elements which rollingly contact said first bearing surface and said first intermediate bearing surface; and said second bearing means comprises a plurality of second bearing elements which rollingly contact said second bearing surface and said second intermediate bearing surface.

23. The serial bearing assembly of claim 22 wherein said speed distribution means rotates around said common central axis upon rotation of said first member relative to said second member.

24. The serial bearing assembly of claim 23 wherein said speed distribution means comprises a first planetary gear drivingly engaged to said first member and said second member and pivotably mounted to said intermediate member.

25. The serial bearing assembly of claim 22 wherein said serial bearing assembly is a thrust bearing assembly and said first bearing surface, said second bearing surface, said first intermediate bearing surface, and said second intermediate bearing surface lie in parallel offset planes, said parallel offset planes being perpendicular to said common central axis.

26. The serial bearing assembly of claim 25 wherein said serial bearing assembly is a radial thrust bearing assembly and said first and second bearing means each comprises a plurality of tapered rollers.

27. The serial bearing assembly of claim 22 wherein said serial bearing assembly is a radial bearing assembly, said intermediate member is annular; and said first member, said intermediate member, and said second member all lie in a common plane perpendicular to said common central axis.

28. The serial bearing assembly of claim 27 further comprising an annular third member having an annular third bearing surface and third bearing means; and wherein said second member has a supplementary bearing surface, said third bearing means being between said third bearing surface and said supplementary bearing surface; and said speed distribution means further comprises a second wheel drivingly engaged to said first member and said third member and pivotably mounted to said second member.

29. The serial bearing assembly of claim 28 wherein said speed distribution means further comprises a third wheel pivotably mounted to said second member on a common pivot point with said second wheel and wherein said second wheel is drivingly engaged to said third member by way of said third wheel.

30. The serial bearing assembly of claim 29 wherein each of said first, second, and third wheels is a planetary gear rotating about said common central axis.

* * * * *